United States Patent
Muchow et al.

(10) Patent No.: US 7,918,136 B2
(45) Date of Patent: Apr. 5, 2011

(54) MICROMECHANICAL SENSOR ELEMENT

(75) Inventors: Joerg Muchow, Reutlingen (DE);
Hubert Benzel, Pliezhausen (DE);
Simon Armbruster, Gomaringen (DE);
Christoph Schelling, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 127 days.

(21) Appl. No.: 12/158,425

(22) PCT Filed: Nov. 21, 2006

(86) PCT No.: PCT/EP2006/068711
§ 371 (c)(1),
(2), (4) Date: Dec. 17, 2008

(87) PCT Pub. No.: WO2007/073994
PCT Pub. Date: Jul. 5, 2007

(65) Prior Publication Data
US 2009/0084182 A1 Apr. 2, 2009

(30) Foreign Application Priority Data

Dec. 22, 2005 (DE) .......... 10 2005 061 413
Jan. 17, 2006 (DE) .......... 10 2006 002 114

(51) Int. Cl.
*G01L 9/06* (2006.01)
(52) U.S. Cl. .......... 73/721; 73/727
(58) Field of Classification Search .......... None
See application file for complete search history.

(56) References Cited

U.S. PATENT DOCUMENTS

| | | | |
|---|---|---|---|
| 4,116,075 A | 9/1978 | Ort | |
| 5,058,436 A | 10/1991 | Bellec et al. | |
| 5,259,248 A | 11/1993 | Ugai et al. | |
| 5,263,375 A | 11/1993 | Okada | |
| 5,614,678 A * | 3/1997 | Kurtz et al. | 73/727 |
| 5,677,560 A * | 10/1997 | Zimmer et al. | 257/418 |
| 6,263,741 B1 * | 7/2001 | Woias | 73/861.47 |
| 6,840,111 B2 * | 1/2005 | Benzel et al. | 73/729.1 |
| 6,861,276 B2 * | 3/2005 | Kurtz | 438/48 |
| 2003/0107095 A1 * | 6/2003 | Kurtz | 257/414 |
| 2004/0118216 A1 * | 6/2004 | Reinhart et al. | 73/766 |
| 2009/0229368 A1 * | 9/2009 | Kurtz | 73/721 |

FOREIGN PATENT DOCUMENTS

| | | |
|---|---|---|
| DE | 2608381 | 8/1977 |
| DE | 267107 | 4/1989 |
| DE | 4108989 | 9/1991 |
| DE | 4024780 | 11/1993 |
| EP | 0404673 | 12/1990 |

OTHER PUBLICATIONS

International Search Report, PCT International Patent Application No. PCT/EP2006/068711, dated Mar. 26, 2007.

* cited by examiner

*Primary Examiner* — Andre J Allen
(74) *Attorney, Agent, or Firm* — Kenyon & Kenyon LLP

(57) ABSTRACT

A micromechanical sensor element (1) is provided, which has a sealed diaphragm (2) affixed in a frame (3), exhibits high sensitivity at high overload resistance and has a small size, and which allows a piezoresistive measured-value acquisition. To this end, at least one carrier element (4), which is connected to the frame (3) via at least one connection link (5), is formed in the region of the diaphragm (2). Furthermore, piezoresistors (6) for detecting a deformation are situated in the region of the connection link (5).

31 Claims, 3 Drawing Sheets

MICROMECHANICAL SENSOR ELEMENT

BACKGROUND INFORMATION

The present invention relates to a micromechanical sensor element having a diaphragm which is fixed in a frame.

Such a sensor element may be configured as microphone, for example. Microphones are usually made up of two capacitor plates, one of the plates being realized as a thin diaphragm which is displaced relative to the second plate by the sound pressure. In the capacitor the deformation of the diaphragm is detected in the form of the resulting charge transfer. In the case of a condenser the charges are supplied by an external voltage source, in the case of an electret the charges are fixedly implanted in a plastic foil.

In the micromechanical microphones known from practice the deflection or deformation of the diaphragm is usually detected in a capacitive and not a piezoresistive manner since the conventional piezoresistive pressure sensors do not exhibit sufficient sensitivity in the pressure range of only 10 Pa and below which is of relevance here. One possibility for increasing the sensitivity of the known pressure sensors is to design a thinner and larger diaphragm. However, when reducing the thickness of the diaphragm it must be taken into account that the piezoresistors have a depth extension of approx. 3μ in most cases. That is to say, the diaphragm should have a thickness of at least 12μ since the piezoresistors would otherwise come to lie in the vicinity of the neutral axis. The diaphragm surface also can be increased only to a limited extent since non-linear effects could otherwise occur in the measured-value acquisition and, furthermore, not only the size of the sensor element would increase but the cost of the entire sensor system as well.

ADVANTAGES OF THE INVENTION

The present invention provides a sensor element of the type mentioned in the introduction, which exhibits high sensitivity at high overload robustness and small size, and which allows a piezoresistive acquisition of measured values. In addition, the sensor element according to the present invention is easily processed further, in particular cut apart and mounted.

According to the present invention, this is achieved by forming at least one carrier element in the region of the diaphragm, which is connected to the frame via a connection link, and by disposing piezoresistors in the region of the connection link to detect a deformation. Here, the mechanical suspension of the carrier element in the frame is first and foremost achieved by the diaphragm, which centers the carrier element in its position. The at least one connection link allows an electrical contacting of circuit elements possibly disposed in the region of the carrier element.

According to the present invention, the deformation of the diaphragm is to be detected with the aid of piezoresistors. To this end, the piezoresistors are placed in regions having maximum mechanical tension. Furthermore, it is possible to easily realize piezoresistors having a high K factor, i.e., piezoresistors exhibiting high sensitivity and supplying a high output signal, in monocrystalline silicon, which is frequently used as base material for said sensor element. According to the present invention, it was recognized on the one hand that the entire diaphragm need not necessarily be made from silicon or some other material into which piezoresistors are able to be integrated in order to realize a piezoresistive sensor principle. On the other hand, it was recognized that the diaphragm surface may be used for other purposes as well, for instance for the integration of circuit components or additional elements having sensor function, if the diaphragm surface is able to be contacted electrically. It is therefore provided to form a carrier element in the region of the diaphragm, which is connected to the frame via at least one connection link. If the sensor element according to the present invention is used as acceleration sensor, then the carrier element functions as seismic mass, which increases the deformation or deflection of the diaphragm and thereby increases the sensitivity of the sensor element. The carrier element and also the at least one connection link are easily formed on the diaphragm when exposing the diaphragm. Since the piezoresistors for measured-value acquisition are integrated in the connection link according to the present invention, it must be made of a suitable material. The other regions of the diaphragm may be produced as very thin regions from a dielectric material.

As a result, the structure of the sensor element according to the present invention is very sturdy overall.

The present invention therefore provides a monolithically integrated sensor element with a piezoresistive sensing principle. The sensor concept according to the present invention not only allows the integration of the piezoresistors but also the integration of a corresponding evaluation circuit.

Due to its high sensitivity, the sensor element according to the present invention may be used not only as pressure or acceleration sensor but as microphone and low-pressure sensor as well. The simple sensor structure according to the present invention is very robust since the diaphragm limits the deflection of the carrier element and thus also acts as overload protection. Furthermore, the diaphragm prevents particles or dust from settling inside the structure during production and processing of the sensor element. The surface of the sensor element sealed by the diaphragm allows the use of conventional design and connection techniques (AVT packaging). For example, the surface may be processed in an add-on process using lithography. The closed surface also simplifies the mounting on a circuit board of the sensor element according to the present invention. The tried and tested flip-chip technology often utilized in practice may be used for this purpose.

There are basically a number of different possibilities for realizing the sensor element according to the present invention, in particular as far as the configuration and design of the diaphragm including the carrier element are concerned.

In view of an uncomplicated manufacture of the sensor element according to the present invention with the aid of standard micromechanical methods, it is advantageous if the at least one connection link has a thinner design than the carrier element, but is thicker than the diaphragm. For one, such links are easy to expose together with the carrier element during patterning of the diaphragm. For another, the piezoresistors as well will then be integratable into such links using the conventional, tried and proven methods.

With increasing deflection, the diaphragm of a sensor element of the type described here exerts an increasing opposing force against a further deflection so that the rigidity of the structure increases with an increase of the force acting from the outside. As a result, the piezoresistors disposed on a connection link provide an output signal even in response to very low external forces, since the carrier element is very easily deflectable from the middle position. However, this output signal is not proportional to the acting force since the connection link is not deformed proportionally to the acting force. It is possible to provide a plurality of symmetrically disposed connection links to linearize the output signal of the piezoresistors, for instance two links disposed opposite one another, or also four links disposed opposite from one another in paired fashion, which then also have a stiffening effect on the diaphragm. In addition, a symmetrical arrangement of the connection links facilitates a symmetrical deformation of the diaphragm. These variants are preferred in cases where the sensor element according to the present invention is to be used as microphone or low-pressure sensor. If the sensor element according to the present invention is to be employed as acceleration sensor, then it is often advantageous if the carrier element acting as seismic mass in this case is connected to the frame of the diaphragm on one side only, for instance by one connection link only.

In practice, micromechanical components are frequently realized in a layer configuration, which includes a substrate as initial layer. In many cases a silicon wafer is used as substrate, and additional layers are applied on its top surface and possibly also on its rear area. As a rule, the substrate is considerably thicker than the other layers of the layer configuration. In such a layer configuration, the individual structural elements of the sensor element according to the present invention may advantageously be configured by patterning the carrier element and the connection links out of the substrate and by realizing the diaphragm in the layer configuration above the substrate. This variant does not require any measures in the production that deviate from standard methods of micromechanics.

In one especially advantageous further development of the sensor element according to the present invention, at least one additional sensor function element is integrated in the carrier element. This makes it possible to easily expand the functionality of the sensor element according to the present invention without additional chip surface being required.

In one advantageous variant of the sensor element according to the present invention, for instance, an additional micromechanical structural element, which assumes an additional sensor function, is formed in the region of the carrier element. As already mentioned in the introduction, a piezoresistive measured-value acquisition is preferred within the framework of the sensor concept described here. In an advantageous manner, the deformations of such a structural element are likewise recorded with the aid of piezoresistors, which should therefore be placed in the regions exhibiting maximum mechanical tension.

An additional pressure sensor, for example, may be realized in the region of the carrier element by forming a cavity underneath the diaphragm. The deformation of the diaphragm will then be detectable with the aid of piezoresistors disposed above the edge region of the cavity. Such a sensor element may then be used as combined sensor for acceleration or dynamic pressure in connection with absolute pressure, in particular as piezoresistive acceleration sensor or piezoresistive microphone combined with a piezoresistive pressure sensor.

However, the micromechanical structural element having sensor function also may be a paddle, for example. Depending on the orientation of the paddle parallel or perpendicular to the diaphragm, this allows the detection of accelerations perpendicular or parallel to the diaphragm of the sensor element. Here, too, the piezoresistors are disposed in the region of maximum mechanical tension, i.e., at the fixed end of the paddle, for the measured value acquisition. Such a sensor element may then be used as combined sensor for dynamic pressure in conjunction with acceleration, in particular as piezoresistive low-pressure sensor or piezoresistive microphone combined with a piezoresistive acceleration sensor.

Last but not least, at this point the possibility of integrating at least parts of a thermal sensor in the region of the carrier element should be mentioned, such as resistors of a mass flow sensor, for example, or diodes of an infrared detector. Placing these components in the region of the carrier element, which is connected to the frame only via connection links and by the diaphragm having very poor thermal conductivity, ensures excellent thermal decoupling.

BRIEF DESCRIPTION OF THE DRAWING

As already discussed in detail above, there are various possibilities for refining and developing the teaching of the present invention in an advantageous manner. In this context, reference is made to the claims subordinate to Claim 1 on the one hand, and to the following description of several exemplary embodiments of the present invention in light of the drawings on the other hand. The figures show:

DESCRIPTION OF THE EXEMPLARY EMBODIMENTS

Figure 1:
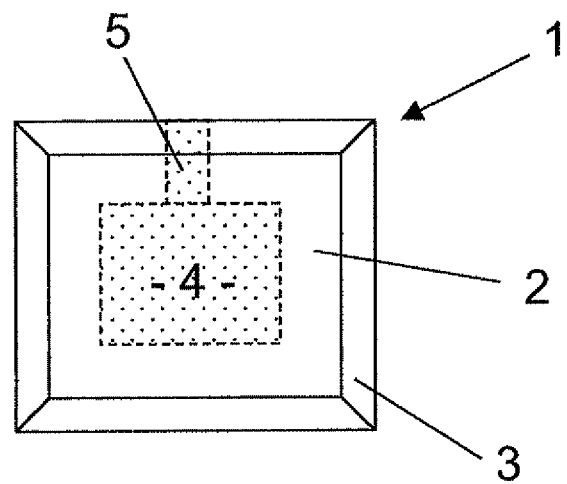
FIG. 1 the plan view of a first sensor element according to the present invention.
Figure 2A:
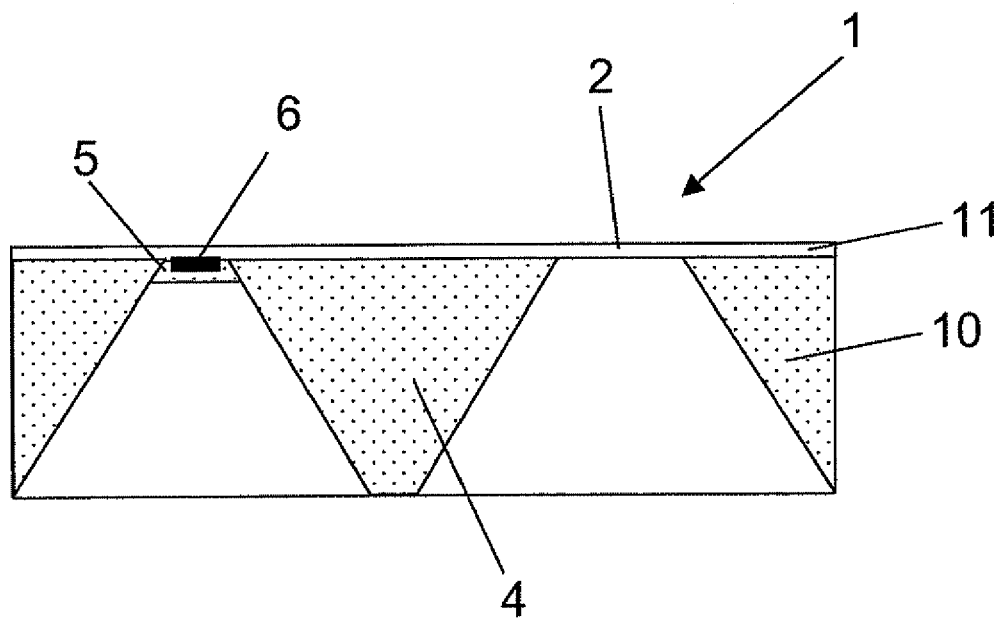
FIGS. 2a and 2b two sectional views through the sensor element shown in FIG. 1.

FIGS. 1 and 2a, b show a micromechanical sensor element 1 having a sealed diaphragm 2, which is affixed in a frame 3. According to the present invention, a carrier element 4 is formed in the region of diaphragm 2, which is connected to frame 3 via a connection link 5. FIG. 2a illustrates that piezoresistors 6 for detecting a deformation of connection link 5 are disposed in the region of connection link 5.

In the exemplary embodiment shown here, carrier element 4 including connection link 5 is realized in the form of a paddle 4, 5 affixed on frame 3 on one side. Connection link 5 has a considerably thinner design than carrier element 4, but is thicker than diaphragm 2, which is also illustrated by FIG. 2a.

Sensor element 1 is designed similarly to a piezoresistive acceleration sensor including a paddle 4, 5 suspended in a frame 3. The thicker, free paddle end, which functions as seismic mass, is deflected when sensor element 1 is exposed to an acceleration. Relatively thin connection link 5 deforms in the process. According to the present invention, this structure was supplemented by a thin, sealed diaphragm 2, so that paddle 4, 5 is unable to vibrate in frame 3 in completely free fashion.

Due to the deformation of connection link 5, piezoresistors 6 situated there vary their resistance value. As a rule, four resistors are arranged in such a way that two resistors in each case increase their value as a result of the occurring mechanical tension, while two resistors lower their value due to this mechanical tension. If the resistors are then interconnected to form a Wheatstone bridge, then a voltage that is proportional to the acceleration is obtained as output signal.

The sensor structure shown in FIGS. 1 and 2a is able to be produced in a relatively simple manner on the basis of a silicon wafer as substrate 10. To this end, the top surface of substrate 10 is provided with a passivation 11, for instance in the form of a thermal oxide and a nitride passivation. Starting from the rear of the wafer, paddle 4, 5 is exposed by KOH etching, for example.

For this purpose, the rear side of the wafer in the region of seismic mass 4 may either be passivated by corresponding rear-side masking or it may be provided with a p+ doping so that an etch stop occurs there. A pn etch stop is also realized in the region of substrate 10 that is to form connection link 5. Via a p-diffusion in the region to be exposed by etching down to passivation 11, a pn-etch stop is then prevented. That is to say, diaphragm 2 is formed by passivation 11 here and may possibly have to be put under tensile stress by an additional LPCVD nitride layer. As an alternative, the dielectric diaphragm may also be made of other materials, such as plastic. A foil or a previously applied resist are options as well. However, the diaphragm also could be made of metal.

Figure 2B:
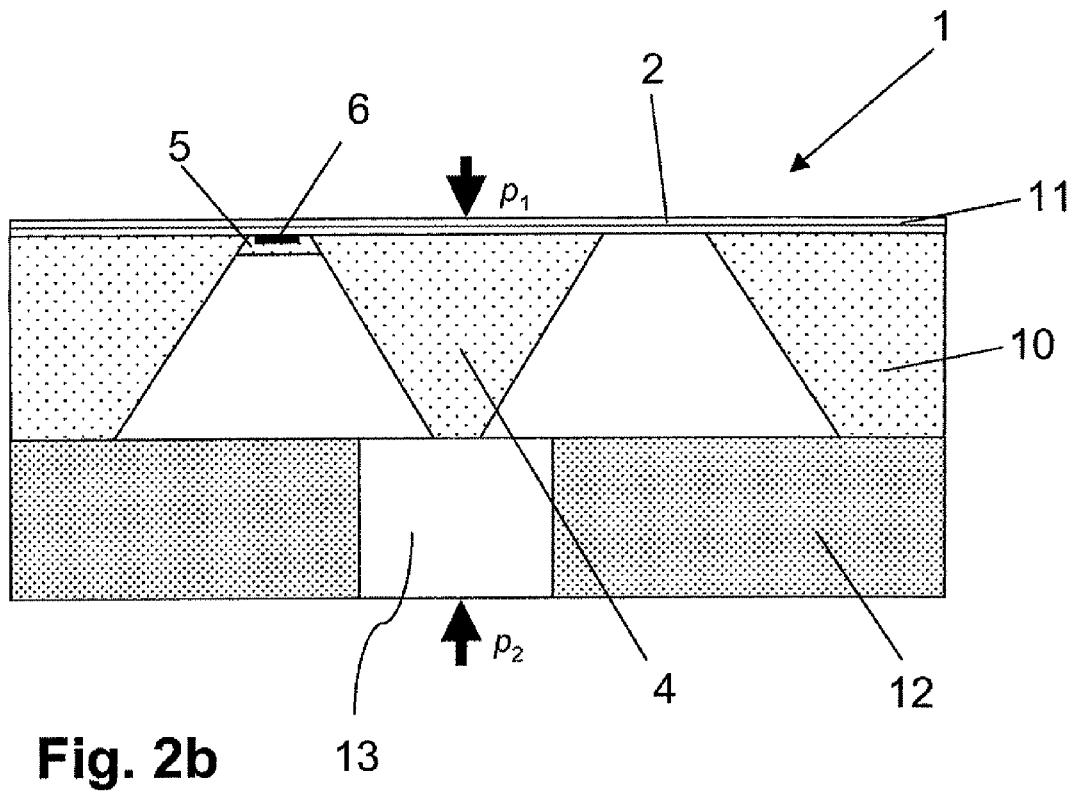

FIG. 2b shows a constructive variant of sensor element 1 shown in FIG. 2a in the form of a low-pressure sensor having a glass wafer 12 anodically bonded to the rear side of the substrate. The pressure may act both from above—p1—and from the rear of sensor element 1—p2—via a bore hole 13 in glass wafer 12. It is placed in such a way that it will not hinder a deflection of seismic mass 4 if possible. The construction illustrated here may be installed in a housing or also bonded to ceramics within the framework of a hybrid construction.

Figure 3:
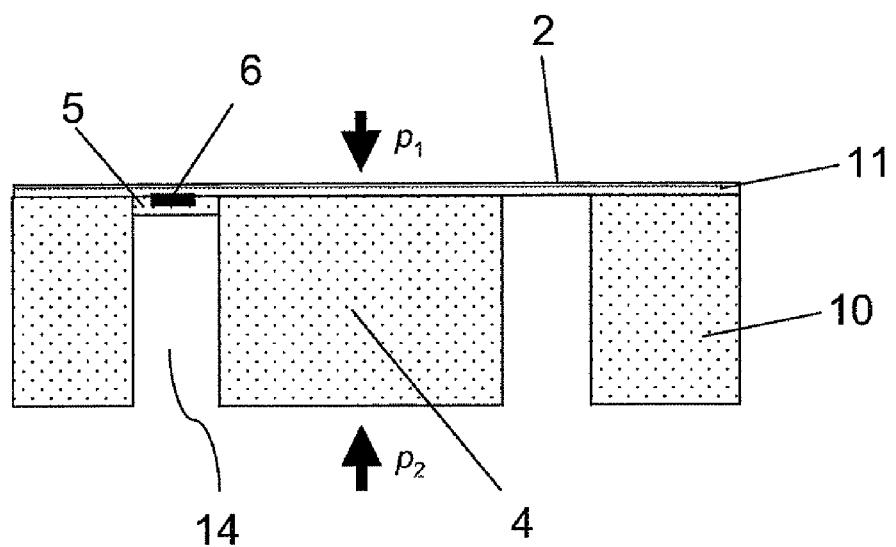
FIG. 3 another sectional view through a sensor element according to the present invention as it is shown in FIG. 1.

The sensor structure shown in FIG. 1 can be produced not only by an anisotropic etching method, as described in connection with FIG. 2a, but also by trenching. In this case seismic mass 4 and connection link 5 are exposed by trenches 14 in the rear side of the wafer, which are delimited by essentially perpendicular side walls, as illustrated in FIG. 3.

Figure 4:
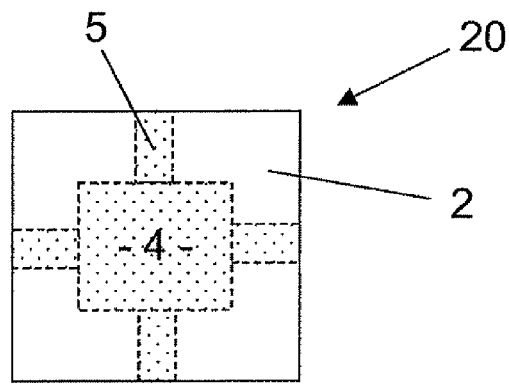
FIG. 4 the plan view of a second sensor element according to the present invention.

FIG. 4 shows a sensor element 20 according to the present invention, which is especially suited for detecting low pressures. The sole difference to the variant shown in FIG. 1 is that the suspension of carrier element 4 includes not only one connection link here, but four connection links 5, which are disposed opposite one another in paired fashion, so that carrier element 4 is fixed in place on all four sides of rectangular frame 3. As in FIG. 1, the surface of sensor element 20 is also sealed by a very flexible dielectric diaphragm 2. This makes it possible to detect even very low pressures, such as sound pressure, for example, with the aid of sensor elements 1 and 20. Differential pressure p2−p1 causes a deflection of carrier element 4 and thus a deformation of connection links 5 into which piezoresistors 6 are diffused. The signal from piezoresistors 6 caused by the flexural stress is proportional to the differential pressure applied.

Figure 5:
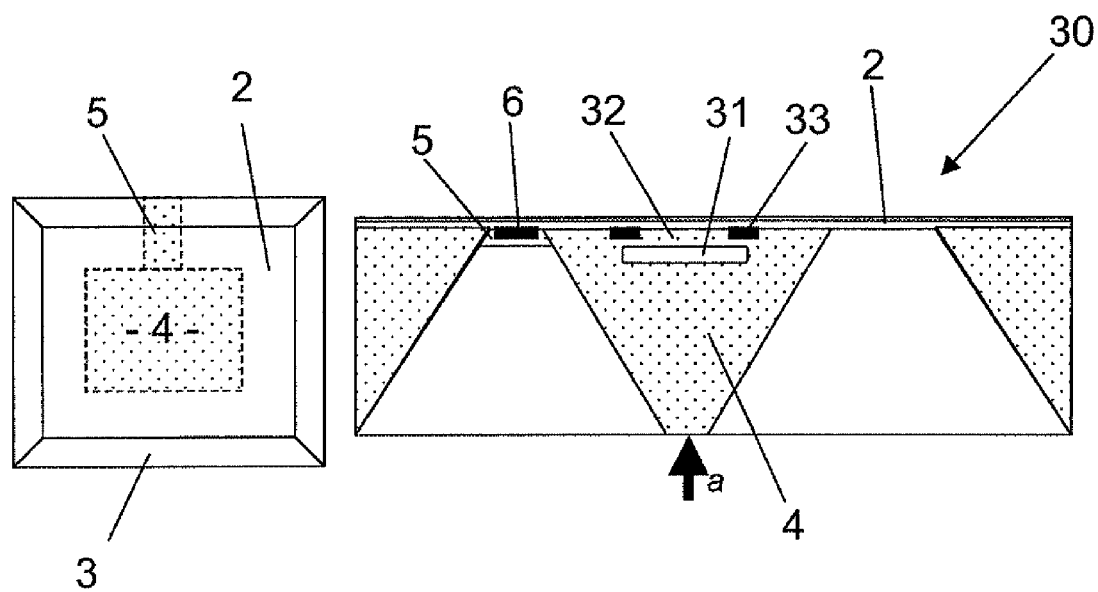
FIG. 5 a plan view and a sectional view of a third sensor element according to the present invention produced on the basis of the sensor element shown in FIG. 1.

FIG. 5 shows a sensor element 30, which represents a further development of sensor element 1 shown in FIGS. 1 and 2a, so that only the additional features of this variant will be elucidated in the following text.

Formed in the region of carrier element 4 of sensor element 30 is a micromechanical structural element as additional functional sensor element, i.e., a cavity 31, which is spanned by a diaphragm 32. This diaphragm 32 is created by the layer system on substrate 10 and a thin substrate layer adjacent to this layer system, in which piezoresistors 33 are integrated to detect a deformation of diaphragm 32. These are disposed in the edge region of diaphragm 32 or above the edge region of cavity 31.

While the fundamental structure of sensor element 30 is produced using bulk-micromechanics, as elucidated in connection with FIGS. 2a and 3, cavity 31 and diaphragm 32 are produced by methods of surface micromechanics.

The variant of a sensor element 30 according to the invention, shown in FIG. 5, constitutes a monolithically integrated acceleration or low-pressure sensor combined with an absolute pressure sensor for higher pressure ranges, the acquisition of measured values taking place piezoresistively in both sensor functions. In response to an acceleration a acting on sensor element 30, paddle 4, 5 is pressed downward. Dielectric diaphragm 2 is configured in such a way in this case that it does not restrict the deflection of paddle 4, 5, or that it restricts it only negligibly. Piezoresistors 6 convert the mechanical tension arising in the region of connection link 5 in response to a deflection of paddle 4, 5 into a signal that is proportional to acting acceleration a. When used as low-pressure sensor or microphone, the measured-value acquisition takes place analogously.

Sensor element 30 may be used, for instance, within the scope of a tire-pressure monitoring system in the motor vehicle. Such systems are usually supplied by a battery. A large part of the energy is required to process the pressure signal and to transmit the calculated pressure values to an external receiver. To achieve the longest possible service life using the smallest battery possible, the process of pressure detection, calculation and transmission should be started only when the car is in motion. As trigger for the pressure acquisition by the pressure-sensor component of sensor element 30, it is now possible to detect the centrifugal force arising in the wheel rotation with the aid of the acceleration sensor component. As an alternative, it is also possible to detect the noises that occur in the wheel rotation provided the fundamental structure of sensor element 30 is configured as microphone.

What is claimed is:

1. A micromechanical sensor element, comprising:
   a sealed diaphragm affixed in a frame;
   at least one carrier element formed in a region of the diaphragm, which is connected to the frame via at least one connection link; and
   piezoresistors adapted to detect a deformation situated in a region of the connection link.

2. The sensor element as recited in claim 1, wherein the connection link is a thinner design than the carrier element, and is thicker than the diaphragm.

3. The sensor element as recited in claim 1, wherein the at least one connection link includes at least two connection links which lie opposite each other.

4. The sensor element as recited in claim 1, wherein the sensor element is in a layer configuration which includes a substrate, the carrier element and the at least one connection link being patterned out of the substrate, and the diaphragm is realized in the layer configuration above the substrate.

5. The sensor element as recited in claim 1, further comprising:
   at least one additional sensor function element formed in the region of the carrier element.

6. The sensor element as recited in claim 5, wherein the additional sensor function element is a micromechanical structural element, the additional sensor function element adapted to acquire measured values piezoresistively.

7. The sensor element as recited in claim 5, wherein, in a region of the carrier element, at least one cavity is formed underneath a diaphragm, and piezoresistors adapted to detect a deformation of the diaphragm are situated above the cavity over an edge region of the cavity.

8. The sensor element as recited in claim 5, wherein at least one paddle, having an orientation perpendicular or parallel to the diaphragm, is formed in the region of the carrier element, and piezoresistors adapted to detect a deflection of the paddle are disposed in a region of a secured end of the paddle.

9. The sensor element as recited in claim 5, wherein the additional sensor function element is part of a thermal sensor.

10. The sensor element as recited in claim 9, wherein the thermal sensor is one of a mass flow sensor, an angle-of-inclination sensor, a thermopile or an infrared detector.

11. The sensor element as recited in claim 1, wherein the sensor element is one of an acceleration sensor or a pressure sensor.

12. The sensor element as recited in claim 11, wherein the sensor element is one of a piezoresistive low-pressure sensor or a piezoresistive microphone.

13. The sensor element as recited in claim 7, wherein the sensor element is one of a piezoresistive acceleration sensor or as piezoresistive microphone combined with a piezoresistive pressure sensor.

14. The sensor element as recited in claim 8, wherein the sensor element is a piezoresistive low-pressure sensor or as piezoresistive microphone combined with a piezoresistive acceleration sensor.

15. The sensor element as recited in claim 1, wherein the piezoresistors are placed in regions having maximum mechanical tension.

16. The sensor element as recited in claim 1, wherein the diaphragm is a single piece.

17. The sensor element as recited in claim 1, wherein the carrier element is configured as a seismic mass which increases the deformation or deflection of the diaphragm and increases a sensitivity of the sensor element.

18. The sensor element as recited in claim 1, wherein the diaphragm provides protection from an overload by limiting a deflection of the carrier element.

19. The sensor element as recited in claim 1, wherein the diaphragm prevents particles or dust from settling inside a structure of the sensor element.

20. The sensor element as recited in claim 1, wherein with increasing deflection, the diaphragm of the sensor element exerts an increasing opposing force against a further deflection so that the rigidity of the structure increases with an increase of a force acting from outside.

21. The sensor element as recited in claim 20, wherein the connection link is not deformed proportionally to the force acting from outside.

22. The sensor element as recited in claim 1, wherein the diaphragm is made of one of (a) a plastic, (b) a previously applied resist, and (c) a metal.

23. The sensor element as recited in claim 1, wherein pressure detection, calculation, and transmission are started only when a car including the micromechanical sensor is in motion.

24. The sensor element as recited in claim 1, wherein the piezoresistors are placed in regions having maximum mechanical tension, wherein the diaphragm is a single piece, and wherein the carrier element is configured as a seismic mass which increases the deformation or deflection of the diaphragm and increases a sensitivity of the sensor element.

25. The sensor element as recited in claim 24, wherein the diaphragm provides protection from an overload by limiting a deflection of the carrier element, and wherein the diaphragm prevents particles or dust from settling inside a structure of the sensor element.

26. The sensor element as recited in claim 25, wherein with increasing deflection, the diaphragm of the sensor element exerts an increasing opposing force against a further deflection so that the rigidity of the structure increases with an increase of a force acting from outside, wherein the connection link is not deformed proportionally to the force acting from outside, and wherein the diaphragm is made of one of (a) a plastic, (b) a previously applied resist, and (c) a metal.

27. The sensor element as recited in claim 24, wherein with increasing deflection, the diaphragm of the sensor element exerts an increasing opposing force against a further deflection so that the rigidity of the structure increases with an increase of a force acting from outside, wherein the connection link is not deformed proportionally to the force acting from outside, and wherein the diaphragm is made of one of (a) a plastic, (b) a previously applied resist, and (c) a metal.

28. The sensor element as recited in claim 27, wherein pressure detection, calculation, and transmission are started only when a car including the micromechanical sensor is in motion.

29. The sensor element as recited in claim 1, wherein the diaphragm provides protection from an overload by limiting a deflection of the carrier element, and wherein the diaphragm prevents particles or dust from settling inside a structure of the sensor element.

30. The sensor element as recited in claim 29, wherein with increasing deflection, the diaphragm of the sensor element exerts an increasing opposing force against a further deflection so that the rigidity of the structure increases with an increase of a force acting from outside, wherein the connection link is not deformed proportionally to the force acting from outside, and wherein the diaphragm is made of one of (a) a plastic, (b) a previously applied resist, and (c) a metal.

31. The sensor element as recited in claim 1, wherein with increasing deflection, the diaphragm of the sensor element exerts an increasing opposing force against a further deflection so that the rigidity of the structure increases with an increase of a force acting from outside, wherein the connection link is not deformed proportionally to the force acting from outside, and wherein the diaphragm is made of one of (a) a plastic, (b) a previously applied resist, and (c) a metal.

* * * * *